(12) United States Patent
Hall et al.

(10) Patent No.: US 12,481,529 B2
(45) Date of Patent: Nov. 25, 2025

(54) CONTROLLER FOR COMPUTING ENVIRONMENT FRAMEWORKS

(71) Applicant: Truist Bank, Charlotte, NC (US)

(72) Inventors: Kenneth Hall, Roswell, GA (US); Bobby Len Robins, Raleigh, NC (US)

(73) Assignee: Truist Bank, Charlotte, NC (US)

( * ) Notice: Subject to any disclaimer, the term of this patent is extended or adjusted under 35 U.S.C. 154(b) by 520 days.

(21) Appl. No.: 17/892,504

(22) Filed: Aug. 22, 2022

(65) Prior Publication Data
US 2024/0061708 A1 Feb. 22, 2024

(51) Int. Cl.
*G06F 9/50* (2006.01)
*G06F 9/54* (2006.01)

(52) U.S. Cl.
CPC .......... *G06F 9/5005* (2013.01); *G06F 9/5061* (2013.01); *G06F 9/541* (2013.01)

(58) Field of Classification Search
CPC ....... G06F 9/5005; G06F 9/5061; G06F 9/541
USPC ........................................................ 718/104
See application file for complete search history.

(56) References Cited

U.S. PATENT DOCUMENTS

| | | | |
|---|---|---|---|
| 12,026,060 B1 * | 7/2024 | Theebaprakasam | G06F 11/1464 |
| 12,039,369 B1 * | 7/2024 | Neelakantam | G06F 3/064 |
| 2018/0192538 A1 * | 7/2018 | Sakalkar | H05K 7/1492 |
| 2021/0311641 A1 * | 10/2021 | Prakashaiah | G06F 3/0604 |
| 2022/0035541 A1 * | 2/2022 | Genereux | G06F 3/067 |

\* cited by examiner

*Primary Examiner* — Hiren P Patel
*Assistant Examiner* — Ross Michael Vincent
(74) *Attorney, Agent, or Firm* — Kilpatrick Townsend & Stockton LLP; Michael A. Springs, Esq.

(57) ABSTRACT

Some examples of the present disclosure relate to an environment framework controller. In one example, a computer system may transmit a first request to a first application programming interface of a first framework configured to manage a first set of computing resources. The computer system may then transmit a second request to a second application programming interface of a second framework configured to manage a second set of computing resources. In response to the first request and the second request, the computer system can receive a first configuration of the first set of computing resources and a second configuration of the second set of resources from the respective frameworks. The computer system use the first configuration and the second configuration to generate an environment snapshot of the first set of computing resources and the second set of computing resources. The computer system may then store the environment snapshot.

20 Claims, 7 Drawing Sheets

CONTROLLER FOR COMPUTING ENVIRONMENT FRAMEWORKS

TECHNICAL FIELD

The present disclosure relates generally to computing infrastructure management. More specifically, but not by way of limitation, this disclosure relates to a controller usable to manage computing resource frameworks within a computing environment.

BACKGROUND

Modern computing environments, including cloud computing environments or other distributed computing systems, can have a variety of interconnected computing resources that are capable of separate configuration, control, orchestration, provisioning, and other management activities. The computing resources can include infrastructure components, networking devices, software applications and services, operating systems, virtualization systems, and the like. Classes of related resources may be managed by frameworks within the distributed computing system.

SUMMARY

One example of the present disclosure includes a method involving transmitting a first request to a first application programming interface (API) of a first framework configured to manage a first set of computing resources in a distributed computing system, the first request being for a first configuration of the first set of computing resources managed by the first framework, the first configuration being associated with a state of the first set of computing resources; transmitting a second request to a second API of a second framework configured to manage a second set of computing resources in the distributed computing system that is different from the first set of computing resources, the second framework being of a different type than the first framework, and the second request being for a second configuration of the second set of computing resources managed by the second framework, the second configuration being associated with a state of the second set of computing resources; generating an environment snapshot indicating the first configuration of the first set of computing resources and the second configuration of the second set of computing resources, the environment snapshot being usable to redeploy the first set of computing resources in the first configuration and the second set of computing resources in the second configuration at a subsequent point in time; and storing the environment snapshot. Some or all of these operations can be implemented by one or more processors.

Another example of the present disclosure involves a processor and a memory storing computer-executable instructions that are executable by the processor for causing the computer system to: transmit a first request to a first application programming interface (API) of a first framework configured to manage a first set of computing resources in a distributed computing system, the first request being for a first configuration of the first set of computing resources managed by the first framework, the first configuration being associated with a state of the first set of computing resources; transmit a second request to a second API of a second framework configured to manage a second set of computing resources in the distributed computing system that is different from the first set of computing resources, the second framework being of a different type than the first framework, and the second request being for a second configuration of the second set of computing resources managed by the second framework, the second configuration being associated with a state of the second set of computing resources; generate an environment snapshot indicating the first configuration of the first set of computing resources and the second configuration of the second set of computing resources, the environment snapshot being usable to redeploy the first set of computing resources in the first configuration and the second set of computing resources in the second configuration at a subsequent point in time; and store the environment snapshot.

Yet another example of the present disclosure involves anon-transitory computer-readable storage medium storing instructions that are executable by a processor for causing a computer system to: transmit a first request to a first application programming interface (API) of a first framework configured to manage a first set of computing resources in a distributed computing system, the first request being for a first configuration of the first set of computing resources managed by the first framework, the first configuration being associated with a state of the first set of computing resources; transmit a second request to a second API of a second framework configured to manage a second set of computing resources in the distributed computing system that is different from the first set of computing resources, the second framework being of a different type than the first framework, and the second request being for a second configuration of the second set of computing resources managed by the second framework, the second configuration being associated with a state of the second set of computing resources; generate an environment snapshot indicating the first configuration of the first set of computing resources and the second configuration of the second set of computing resources, the environment snapshot being usable to redeploy the first set of computing resources in the first configuration and the second set of computing resources in the second configuration at a subsequent point in time; and store the environment snapshot.

DETAILED DESCRIPTION

Certain aspects and features of the present disclosure relate to an environment framework controller configured to provide control and management of multiple frameworks within a computing environment. The environment framework controller can intelligently interact with disparate frameworks within the computing environment to obtain configuration information for the resources managed within those frameworks. The configuration information can be used by the environment framework controller to automatically generate a snapshot of the resources within the computing environment at a given point in time as well as automatically provision and/or deploy resources using a snapshot or similar input.

As used herein, a "framework" can refer to a set of components, managed by a controller, that collectively provide mechanisms to deploy, configure, monitor, maintain, snapshot, scale, or otherwise manage resources within a computing environment. As a particular but non-limiting example, a framework could be a container orchestration system like Kubernetes, which can be configured to configure and deploy applications and other software in containers at the operating system level. In this framework, a set of worker nodes, controlled by the Kubernetes master node, can deploy and configure software resources into the containers on one or more computing devices. As another example, a framework could be a virtualization manager for virtual machines (VMs) implemented in a computing system. In this example, a hypervisor can configure VMs as resources within an operating system environment on a computer system. Additional details of different frameworks are provided below with respect to FIGS. 2 and 3.

Different frameworks may interact in complementary ways within a distributed computing system. Using the examples above, a virtualization framework can be used to configure, deploy, and manage VMs within the computing system and a container orchestration system can be used to deploy software in containers onto those VMs. Additionally, a computing system can have frameworks corresponding to bare metal computing resources (processors, physical memory, and the like) and other hardware and/or networking resources including software defined networks and virtual networks. The complete collection of resources forming a distributed computing system may be managed by different frameworks, each framework having a separate controller and control interface. The frameworks may implement distinct interfaces, including application programming interfaces (APIs), for control and configuration. Each frameworks' controller may be formatted distinctly for that framework and not usable for similar tasks with other frameworks. As a result, development and operations (Dev/Ops) personnel may need to separately configure and manage the frameworks of the computing system.

The environment framework controller can be configured to interact with the different APIs of different frameworks to request and obtain configuration information from the frameworks. The format for calls to the different APIs may be different, such that requests to obtain configuration information for one API may not function correctly with another API. In addition, the configuration information can include specifications of the computing resources in the framework. For example, configuration information from a virtualization framework can include the specification of the number of processors and amount of memory and storage allocated to each VM in the framework, identification information for the VMs, networking configuration of the VMs, type of operating system installed on the VMs, the state of applications executing on the VMs at a point in time, and the like. The configuration of different sets of computing resources in different frameworks may result in different formats for the configuration information that is obtained by the environment framework controller. For example, some frameworks may provide configuration information in a JSON format, while others provide configuration information in an XML format. The environment framework controller can be configured to identify the corresponding API for a framework, request the configuration information, and handle the received configuration information correctly for its format and the resources to which it corresponds.

The environment framework controller can also be configured to generate a snapshot of the computing environment. The snapshot can include the configuration information received from the frameworks in the computing environment. The environment framework controller can convert configuration information received from a framework to generate a snapshot in a unified format usable by the environment framework controller. For example, the snapshot can be a JSON file that includes configuration information from each framework within the computing environment. The snapshot can also be an XML file or other similar markup language file for recording configuration information. In addition, the environment framework controller can receive and store other data or data objects corresponding to the configuration information. For example, a framework that includes software images for software applications deployed in the computing environment can include the software images, or the locations of a repository of software images, as data in addition to the configuration information sent to the environment framework controller.

The environment framework controller can use a stored snapshot to redeploy or configure the resources of a computing environment. For example, a testing environment for the initial testing and configuration of applications may not need to be maintained in a running state when testing is not being conducted. So, the testing environment may be shut down for a period of time to conserve resources until it is needed again. When the testing environment is needed again, the environment framework controller can be used to automatically and rapidly redeploy the testing environment based on a corresponding snapshot. For example, using a snapshot of the testing environment, the environment framework controller can identify configuration information in the snapshot corresponding to a particular framework, identify the appropriate API and format for the framework, and send the configuration information to the framework to deploy the corresponding resources. In this way, a testing environment can be started and restarted quickly depending on the needs of software development. As further examples, the environment framework controller can use a snapshot to deploy resources onto new physical hardware of a new data center to support large scale outs of bare-metal resources or can use a snapshot of a testing environment to deploy a duplicate testing environment at another facility or location. In some cases, the environment framework controller can use the snapshot to provision only a portion of the computing resources to the respective frameworks, for instance when deploying software resources that were snapshotted from a testing environment into an existing production environment. In some examples, the snapshot can be modified to change the configuration of the resources before the environment framework controller uses the frameworks to deploy the resources.

The techniques described herein may provide several advantages over conventional methods of infrastructure provisioning. An environment framework controller can provide a unified interface for separate frameworks and framework controllers within a computing environment. Such unification can increase efficiency by centralizing the automation of scripts for different frameworks. The environment framework controller can also significantly reduce the amount of traffic, including Dev/Ops traffic, for interfacing with several different framework controllers to setup, execute, and/or monitor configuration tasks. The environment framework controller can also reduce the likelihood of configuration errors for computing resources by standardizing the format of the configuration information in a snapshot. Moreover, the environment framework controller allows the state of computing resources to be saved and quickly redeployed. For example, a testing environment can be shut down when not being used but quickly redeployed when needed, saving computing resources versus maintaining an always-on testing environment. The snapshots can also be updated for all or a portion of the resources and intelligently sent through to the corresponding frameworks for deployment, thereby allowing resources to be updated as part of a deployment from the snapshot (for instance, during a restart of a testing environment) rather than deploying the resources according to a previous configuration and then updating those resources at a later time.

These illustrative examples are given to introduce the reader to the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

Figure 1:
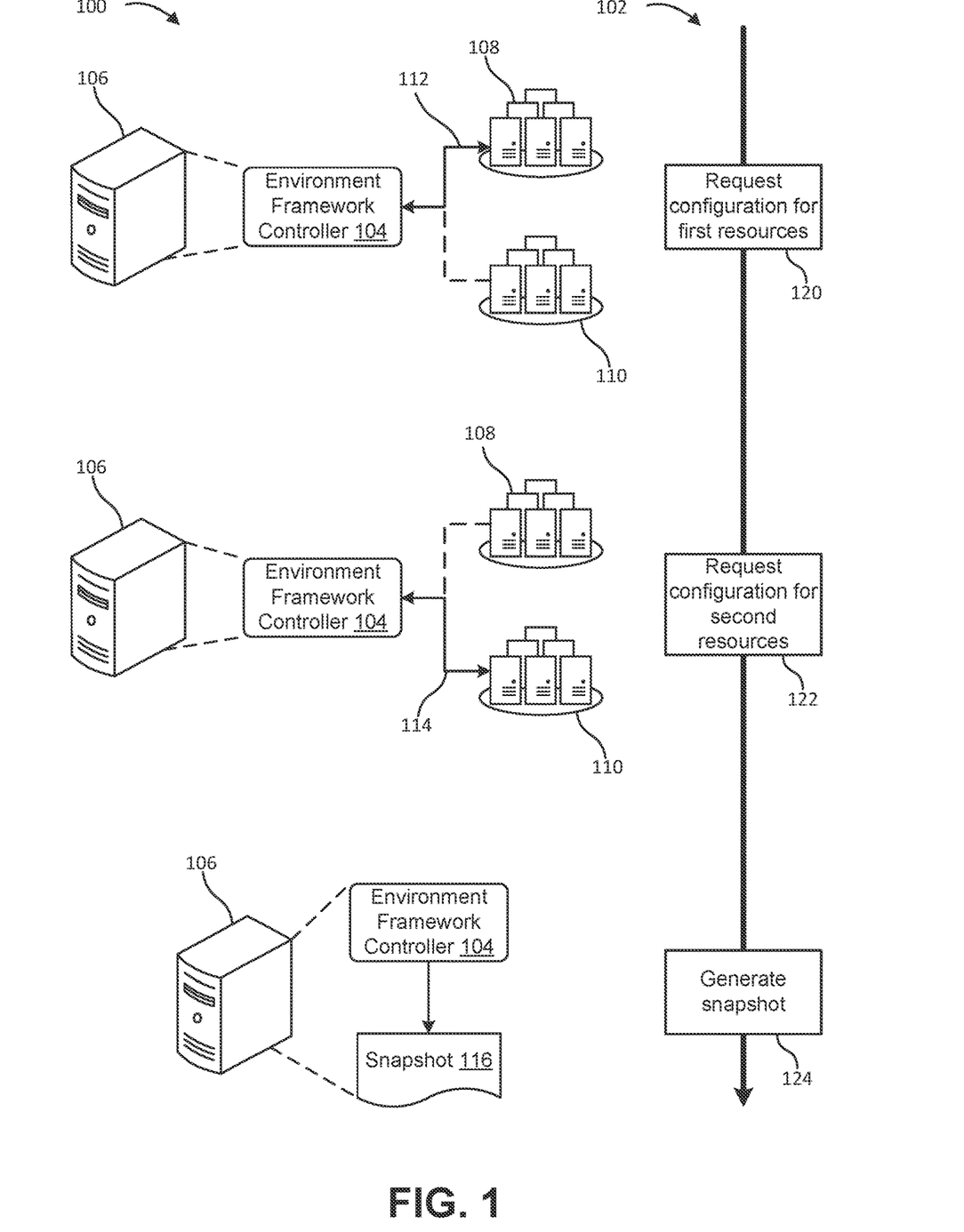
FIG. 1 is a block diagram and associated flow chart of an example process to generate a snapshot from frameworks within a computing environment, according to some aspects of the present disclosure.

FIG. 1 is a block diagram and associated flow chart of an example process to generate a snapshot from frameworks within a computing environment, according to some aspects of the present disclosure. The diagram depicts a computer system 106 that can perform the operations of process 102. The computer system 106 may be a server device configured to run an environment framework controller 104. The computer system 106 can include additional computing devices, including multiple server devices, or may be an example of a distributed computing system or cloud computing system that can implement an environment framework controller 104 for performing one or more operations of process 102. For example, the computer system 106 may be connected to computing devices within a data center for managing frameworks that in turn control, configure, and orchestrate sets of computing resources within the distributed computing system. Additional details about computer systems that are capable of performing the techniques of this disclosure are provided below with respect to FIGS. 2 and 5.

The process 102 begins at block 120 with the environment framework controller 104 transmitting a request 112 to a first framework managing a first set of computing resources 108. The request 112 may be a request for a current configuration of the first set of computing resources 108. The request 112 may be configured for an API of the first framework. The environment framework controller 104 may also be configured to communicate with a second framework that includes a second set of computing resources 110. As described briefly above, the first set of computing resources 108 can include any suitable number of hardware, software, and/or firmware resources in a computing environment that are associated within a framework. For example, the resources can include VMs deployed on one or more server devices within a distributed computing system. As another example, the resources can include network devices, including physical and software implemented switches, gateways, proxies, load balancers, and other similar networking devices. As still another example, the resources can include software applications and services deployable into a distributed computing environment. The first set of resources may be managed from a controller of the first framework, which can deploy, configure, monitor, maintain, snapshot, and scale resources based on processing, memory, storage, networking, application configurations, and/or other custom metrics within the computing system. The current configuration of the first set of resources 108 can include hardware configurations and/or software configurations.

At block 122, the environment framework controller 104 can transmit a second request 114 to a second framework managing the second set of computing resources 110. The second request 114 may be a request for current configuration of the second set of computing resources. The second request may be configured for a second API of the second framework. The second API can be different from the API of the first framework. As with the first set of resources 108, the second set of resources 110 can include any suitable number of hardware, software, and/or firmware resources in a computing environment that are associated with the second framework. The first set of resources can be different from the second set of resources, so that the first framework can manage, and be instructed to manage, the first set of resources independently from the management of the second set of resources by the second framework. The current configuration of the second set of resources 110 can include hardware configurations and/or software configurations.

At block 124, the environment framework controller 104 can generate a snapshot 116 of the current configurations of the first set of resources 108 and the second set of resources 110. The snapshot 116 can be in a single format, for example, a JSON file or other markup language. The configuration information received from each framework for the first set of resources 108 and the second set of resources 110 may be in distinct formats. The environment framework controller 104 can convert the configuration information into a single format that is usable by the environment framework controller 104 to send instructions to the frameworks to provision the first set of resources 108 and the second set of resources 110 according to the respective configurations.

Figure 2:
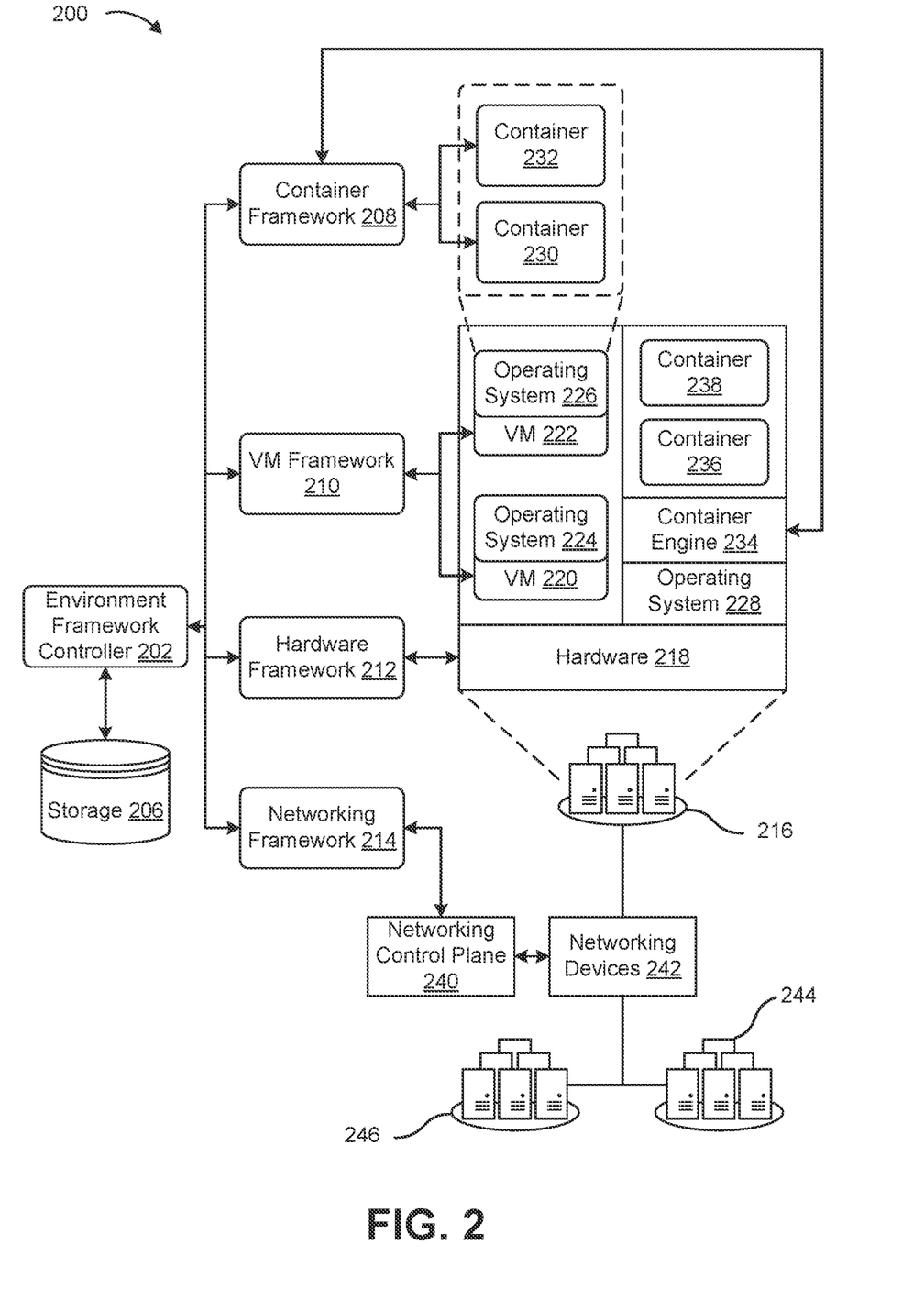
FIG. 2 is another block diagram of a computer system and environment framework controller that can manage multiple frameworks within a computing environment, according to some aspects of the present disclosure.

FIG. 2 is another block diagram of a computer system 200 and environment framework controller 202 that can manage multiple frameworks within a computing environment, according to some aspects of the present disclosure. The environment framework controller 202 may be an example of environment framework controller 104 described above with respect to FIG. 1. The environment framework controller 202 may be implemented on a computer system or other suitable computing device, including computer system 106 of FIG. 1, which may be a component of computer system 200. The computer system 200 may be a cloud computing system implemented in one or more data centers hosting computing devices, including servers, networking devices and related hardware, storage devices, disk drives and/or arrays for block storage, object storage, distributed caches, network accessible storage, and other similar devices. For example, as depicted in FIG. 2, the computer system 200 can include computing devices 216, which can represent the bare-metal computing resources for an environment (e.g., production environment) within a data center. Similarly, computing devices 246 and computing devices 244 can represent the bare-metal computing resources for separate environments within the same data center or one or more separate data centers (e.g., testing environments within a different data center from a production environment).

The computer system 200 can include multiple frameworks, including a container framework 208, a VM framework 210, a hardware framework 212, and a networking framework 214. More or fewer frameworks may be included in a computer system depending on the configuration of the computing resources therein. Environment framework controller 202 may be configured to communicate with the frameworks over one or more networks. For example, the environment framework controller 202 may be hosted on a server within a data center and connected to the network fabric of the data center along with the server devices and other computing devices in the data center. The communications between the environment framework controller 202 and the frameworks can include transmitting requests, receiving configuration information from the frameworks, transmitting provisioning instructions, transmitting updated configuration information, and the like. The communications may be made using one or more protocols. For example, a request for configuration information may be made to one framework as an HTTP request, while a second request for configuration information may be made to a second framework as a separate RESTful call.

In some examples, the hardware framework 212 can be configured to manage the hardware 218 of computing devices 216. The hardware 218 can include the bare-metal computing resources of a data center, including server devices. The hardware framework 212 can then manage the allocation of processors, memory, and storage to generate logical partitions of the servers. As one non-limiting example, a single server of hardware 218 may include two processors, each with 16 processing cores, and two terabytes of dynamic memory. The hardware framework 212 can configure this server to have two logical partitions, each functioning as an independent logical server device, with one processor/16 cores and 1 TB of memory allocated to each. Each logical server can have different software installed, including different operating systems like operating system 228, and can be configured independently. The hardware framework 212 can interact with hardware 218 to modify firmware of the computing devices to manage the settings of the logical partitions.

In some examples, the VM framework 210 can be configured to manage VMs implemented on the hardware 218. The VMs may be provisioned on a server device, including a logical server device managed by hardware framework 212. As exemplified in FIG. 2, VM framework 210 can provision VM 220 and VM 222 on a server device of the computing devices 216, which can be a logical partition as described above. VM framework 210 can configure VMs according to customizable configuration information, including specifying the allocation of physical and/or logical resources to each VM on a computing device, the operating system for each VM, networking settings, the software loaded onto each VM, and other settings and/or parameters. For example, VM 220 may be allocated eight processing cores, 1024 GB of dynamic memory, and have AIX installed as an operating system, while VM 222 may be allocated four processor cores, 512 GB of dynamic memory, and have Windows Server® installed as an operating system. The VM framework 210 can use one or more hypervisors within the hardware 218 to provision and provide local virtualization management for VMs. For instance, each logical partition or a server device can include a separate hypervisor. The VM framework 210 can then include a controller of the hypervisors within the computer system 200.

In some examples, the container framework 208 can be configured to manage containers deployed to the computer devices of hardware 218. A container can be a package of software resources that are executable on a computer at the operating system level and form a partially isolated environment on the computer. The software resources in the container may include libraries, configurations, and dependencies for a single application in the container. The application can therefore execute in the container on the computer without relying on software resources in other environments outside the container. The host operating system, in conjunction with a container manager like container framework 208, can allocate computing resources to each container as needed to properly execute the container software. Containers can be generated from software images of the package of software resources. Containers can communicate with each other over specified channels (e.g., a container API specified by container framework 208) to function collectively as a larger service or application.

As a specific example, a container can include the software for a single application and corresponding dependencies and libraries to execute that software on a computing device. As another example, a container can include the software for a single microservice with additional containers including the software for separate microservices that can be deployed and execute collectively to provide an application within the computing environment. As depicted in FIG. 2, container framework 208 may be configured to deploy container 230 and container 232 to VM 222 (provisioned by VM framework 210) within a logical partition of a server device (managed by hardware framework 212). In some instances, the container framework 208 may manage a container engine 234 deployed to a computing device. The container engine 234 may deploy container 236 and container 238 on the same computing device under the supervisory control of container framework 208. As a specific example of this relationship, container framework 208 can be a Kubernetes instance using Docker as the container engine 234.

In some examples, the networking framework 214 can be configured to provision a networking control plane 240 to provide centralized configuration and control of data planes implemented on networking devices 242. For example, networking control plane 240 may be a software defined network that includes routing protocols (e.g., BGP) for creating routing tables and other routing information as well as services for managing and configuring a network topology. The networking control plane 240 can interface with the networking devices 242 using a networking protocol for communication between control plane and data plane, for example OpenFlow. The networking devices 242 can include physical switches, routers, gateways, and the like, as well as virtual implementations of these devices (e.g., a virtual switch). The networking devices 242 can forward traffic between the computing devices 216 as well as additional computing devices 244 and computing devices 246. For example, the networking devices 242 may form the networking infrastructure within a data center hosting a production environment on computing devices 216 and two testing environments on computing devices 244 and computing devices 246.

In some examples, frameworks can have a checkpointing or snapshotting component usable to generate a record of the configuration of the resources managed by the frameworks. For example, a framework managing resources at the application level can use a checkpoint/restore program like checkpoint/restore in userspace (CRIU) to record a state of executing programs. The recorded state can include configuration information for the application. The current configuration of resources that change less often, including logical partitions of server devices, may be obtained by comparable tools. For example, the hardware framework 212 can obtain current configuration information for hardware 218 by inspecting the current resource allocation and partitioning indicated by each server device, for instance by server firmware.

The configuration information from each framework may be sent to environment framework controller 202 in response to requests for the current configuration of the resources managed by the separate frameworks. The environment framework controller 202 can use the configuration information to generate a snapshot of the computer system 200, including the information corresponding to the state of computing devices 216, networking devices 242, and the VMs, containers, and other applications executing therein. The environment framework controller 202 can store the snapshot at storage 206, which can may be a database, data store, or other storage for persisting snapshots and similar data.

Figure 3:
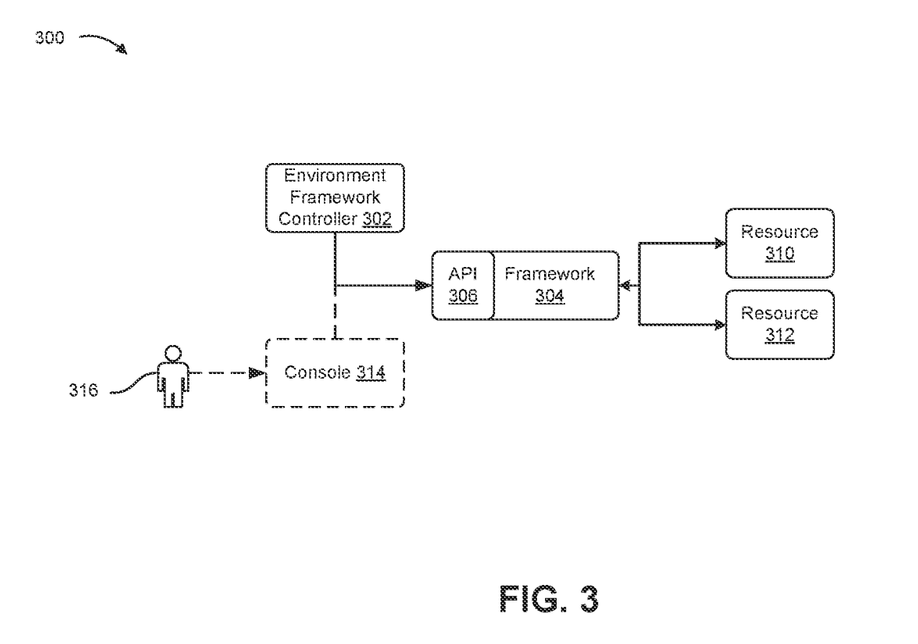
FIG. 3 is a block diagram of computer system with an example framework, according to some aspects of the present disclosure.

FIG. 3 is a block diagram of computer system 300 with an example framework 304, according to some aspects of the present disclosure. The computer system 300 can include environment framework controller 302, which may be an example of environment framework controller 202 described above with respect to FIG. 2, while the framework 304 may be an example of any of the frameworks described above with respect to FIG. 2.

The framework 304 can include an interface through which requests, commands, and other interactions can be sent and received. The interface can include an API 306. The API 306 can specify a protocol for transmitting requests to the framework 304, the format of the requests, the format of responses, and similar characteristics of interactions with the framework 304. For example, the API 306 can be a REST API with a specific set of commands that can be invoked with corresponding API calls. The framework 304 may take one or more actions associated with the command in response to the call. For instance, the framework 304 may snapshot, checkpoint, or otherwise obtain a current configuration of a resource, including resource 310 and resource 312. The environment framework controller 302 can send requests to the framework 304 using the API 306.

In some examples, the framework 304 may be accessible by a user 316, including Dev/Ops personnel or other users. The user 316 can access a console 314, which can implement a graphical user interface (GUI), command line interface, or other interface with the framework 304. The console 314 may be configured to send requests or other interactions to the framework 304 using API 306. For example, the user 316 may access the framework 304 to send an updated configuration for resource 310, which in some examples is a manual task that can be replaced by automated provisioning requests sent from environment framework controller 302.

Figure 4:
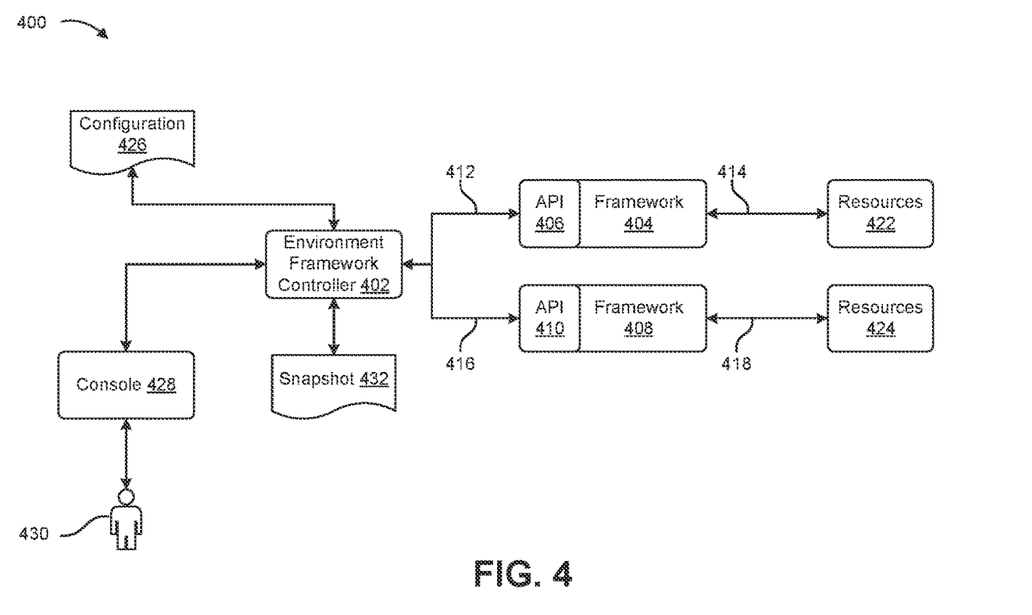
FIG. 4 is a block diagram of a computer system with an example environment framework controller, according to some aspects of the present disclosure.

FIG. 4 is a block diagram of a computer system 400 with an example environment framework controller 402, according to some aspects of the present disclosure. The framework controller 402 may be an example of other environment framework controllers described herein, including environment framework controller 202 of FIG. 2. The computer system 400 can include multiple frameworks like framework 404 and framework 408. These frameworks may be examples of any of the other frameworks described above, including container framework 208 and VM framework 210.

Framework 404 can include API 406 and can be a first framework for managing, configuring, provisioning, monitoring, and/or otherwise maintaining resources 422, which can be a first set of computing resources in the computer system 400. Framework 408 can include API 410 and can be a second framework for managing, configuring, provisioning, monitoring, and/or otherwise maintaining resources 424, which can be a second set of computing resources in the computer system 400. API 406 and API 410 can be different interfaces that specify a different set of commands, rules, protocols, and/or other characteristics of calls, commands, requests, and other traffic sent to and from the respective framework.

The environment framework controller 402 can send a first request 412 to framework 404 through API 406 to obtain a current configuration of the resources 422. In response, framework 404 can obtain configuration information 414 of the current configuration of resources 422. The configuration information 414 can be sent from the framework 404 to environment framework controller 402 through API 406. Similarly, environment framework controller 402 can send a second request 416 to framework 408 through API 410 to obtain a current configuration of the resources 424. In response, framework 408 can obtain configuration information 418 of the current configuration of resources 424 and send the configuration information 418 to environment framework controller 402. The environment framework controller 402 can then generate a snapshot 432 using the configuration information 414, 418.

In some examples, environment framework controller 402 can retrieve snapshot 432 and use snapshot 432 to provision resources in the computer system 400 in conjunction with one or both of framework 404 and framework 408. For example, resources 422 and resources 424 may have been previously snapshotted by environment framework controller 402 and then subsequently de-provisioned, as in the case of decommissioning a testing or other computer environment when the environment is no longer needed. To restore the computing environment, the environment framework controller 402 can identify the configuration information in snapshot 432 that corresponds to resources 422 and generate and transmit an associated call to API 406 that contains the configuration information. In response, framework 404 can use the configuration information to provision resources 422 in the computer system 400. Similarly, the environment framework controller 402 can identify the configuration information in snapshot 432 that corresponds to resources 424 and generate and transmit an associated call to API 410 that instructs framework 408 to use the configuration information to provision resources 424.

In some examples, the environment framework controller 402 can receive an updated configuration 426 that can be used to modify a stored snapshot 432. In other examples, the updated configuration 426 can be used to configure new resources and/or update or modify existing resources in the computer system 400. For instance, the environment framework controller 402 can use the updated configuration 426 and a framework for managing VMs to provision additional VMs in the computer system 400 to support scaling of an application to meet additional demand.

The environment framework controller 402 may be accessible through a console 428. A user 430 can use the console 428 to send commands to environment framework controller 402 to configure the behavior and functionality of environment framework controller 402. For example, the user 430 can use console 428 to send one or more scripts to environment framework controller 402 that can be useable to automate tasks associated with controlling the frameworks in the computer system 400. The scripts may be scripts defining a sequence of operations for instructing frameworks to perform tasks associated with provisioning resources. For instance, a script can be a deployment script for an application usable by a container framework to deploy the application in one or more containers in a computing environment. As another example, the user 430 can use console 428 to configure a predefined schedule for the environment framework controller 402 to request current configurations of resources 422 and resources 424.

Figure 5:
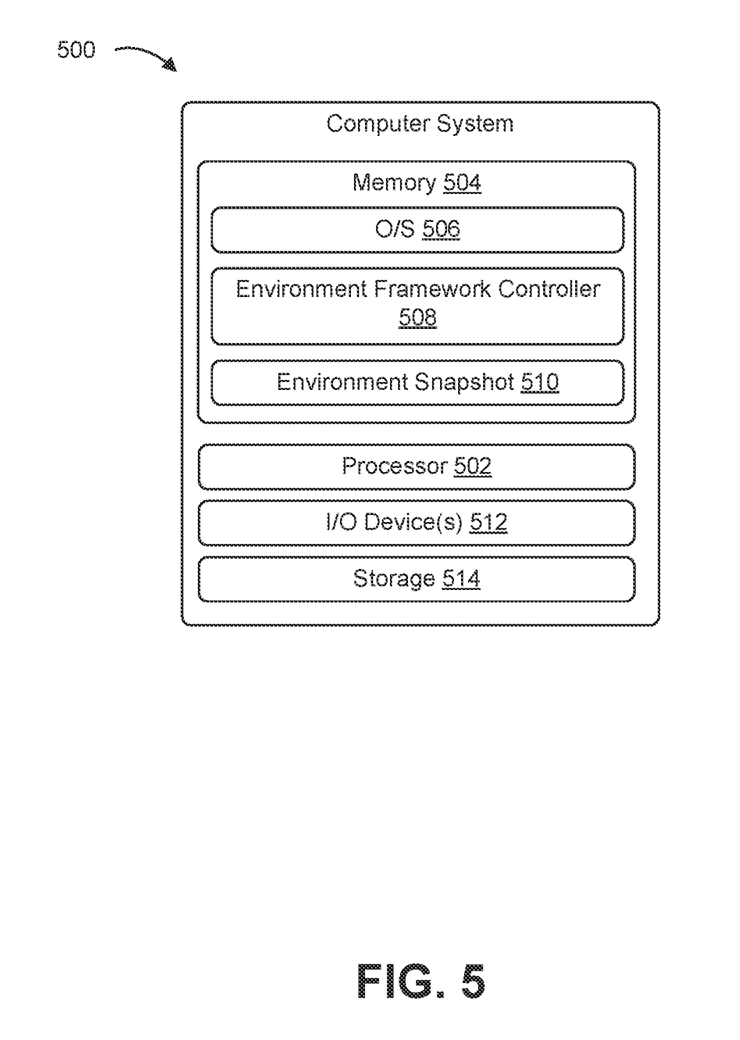
FIG. 5 is a block diagram of an example computer system, including modules that may perform functions in accordance with at least one aspect of the present disclosure.

FIG. 5 is a block diagram of an example computer system 500, including modules that may perform functions in accordance with at least one aspect of the present disclosure. The computer system 500 may be an example of other computer systems described herein, including computer system 106 of FIG. 1, for implementing an environment framework controller 508. The computer system 500 can have at least one processor 502, a memory 504, and one or more input/output ("I/O") devices 512. The I/O device(s) 512 can include displays, monitors, touch screens, a mouse, a keyboard, or other suitable I/O devices.

The processor 502 can include one processing device or multiple processing devices. Non-limiting examples of the processor 502 include a Field-Programmable Gate Array (FPGA), an application-specific integrated circuit (ASIC), or a microprocessor. The processor 502 can execute instructions stored in the memory 504 to perform operations. In some examples, the instructions can include processor-specific instructions generated by a compiler or an interpreter from code written in any suitable computer-programming language, such as C, C++, C #, and Java.

Memory 504 can include one memory device or multiple memory devices. The memory 504 may store program instructions that are loadable and executable on the processor 502, as well as data generated during the execution of these programs, including snapshots, configuration information, updated configuration information, predefined schedules, scripts, and the like. Depending on the configuration and type of computer system 500, the memory 504 may be volatile (such as random access memory ("RAM")) or non-volatile (such as read-only memory ("ROM"), flash memory, etc.). In some implementations, the memory 504 may include multiple different types of memory, such as static random access memory ("SRAM"), dynamic random access memory ("DRAM"), or ROM.

The computer system 500 may also include additional storage 514, such as either removable storage or non-removable storage including, but not limited to, magnetic storage, optical disks, and/or tape storage. The disk drives and their associated computer-readable media may provide non-volatile storage of computer-readable instructions, data structures, program modules, and other data for the computing devices. In these embodiments, the storage 514 may be utilized to store data contents received from one or more other devices, including snapshots, configuration information, and schedules.

The memory 504 may include an operating system 506 and one or more application programs, modules, or services for implementing the features disclosed herein, including an environment framework controller 508 and environment snapshot 510. In some examples, the environment framework controller 508 may be configured to transmit a request to a framework using an API of the framework. In response, the framework can obtain configuration information for a current state of a set of computing resources managed by the framework. The environment framework controller 508 can request configuration information from multiple frameworks. The environment framework controller 508 may be configured to generate a snapshot from the configuration information. The requests may be sent on a predefined schedule. For example, the environment framework controller 508 may be configured to snapshot the resources of a computing environment every night. In some instances, some requests for configuration information for certain resources may be obtained more frequently than configuration information for other resources. For example, the environment framework controller 508 may request configuration information for containers executing in the computing environment every night, but only request configuration information for hardware configuration each week.

The environment snapshot 510 can include the configurations, settings, and parameters of hardware resources and software resources in a computing environment. The configuration information in the environment snapshot 510 can correspond to a state of the hardware and software resources at a particular time, which can be included as part of the environment snapshot 510 as timestamps. Some portions of the environment snapshot 510 may be updated as new configuration information is received, while other portions remain unchanged. In some examples, the environment snapshot 510 can be modified or updated using additional configuration information received from another computer system. For example, a user can send an update for computer resources to the environment framework controller 508, which can then update a corresponding portion of the environment snapshot 510.

Figure 6:
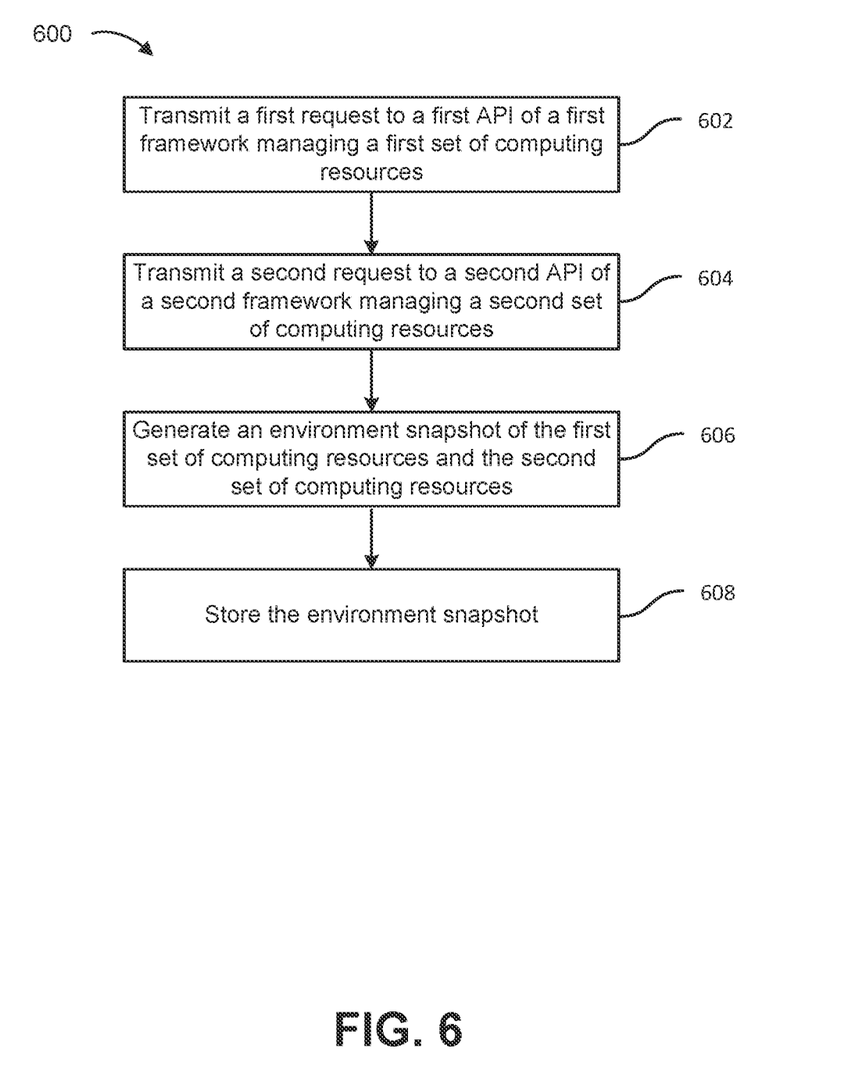
FIG. 6 is a flow diagram of an example process for generating a snapshot of a computing environment using an environment framework controller, according to some aspects of the present disclosure.

FIG. 6 is a flow diagram of an example process 600 for generating a snapshot of a computing environment using an environment framework controller, according to some aspects of the present disclosure. The process 600 may be performed by computer system 500 of FIG. 5 implementing an environment framework controller as described herein.

The process 600 is illustrated as a logical flow diagram, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be omitted or combined in any order and/or in parallel to implement the processes.

Some or all of the process 600 (or any other processes described herein, including process 700, or variations, and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

Process 600 may begin at block 602 with a computer system transmitting a first request to a first API of a first framework managing a first set of computing resources. An example of the computer system can include the computer system 500 of FIG. 5. An example of the first framework can include framework 404 of FIG. 4. The first API may define protocols and formats for requests, calls, and/or other traffic sent to the first framework using the first API.

At block 604, the computer system can transmit a second request to a second API of a second framework managing a second set of computing resources. The second set of computing resources can be different from the first set of computing resources. For example, the first set of computing resources may be hardware resources such as server devices in a data center, while the second set of computing resources may be VMs provisioned on the server devices. The first API can be different from the second API. For example, the format of calls and the commands defined by the first API may be different from the format of calls and the commands defined by the second API.

In some examples, the computer system can identify the first API of the first framework and generate the first request according to the first API. Similarly, the computer system can identify the second API of the second framework and generate the second request according to the second API.

In response to the first request and the second request, the computer system may receive a first configuration and a second configuration of the corresponding set of resources. The first configuration may correspond to a state of the first set of computing resources, while the second configuration may correspond to a state of the second set of computing resources.

At block 606, the computer system can generate an environment snapshot using the first configuration and the second configuration. The environment snapshot may be usable to redeploy the first set of computing resources and the second set of computing resources at a subsequent point in time. At block 608, the computer system can store the environment snapshot.

In some examples, the computer system can receive updated configuration information for the first set of computing resources. For example, a user may upload an update for an application executing on one or more VMs in the computing environment. The computer system can use the updated configuration information to modify the environment snapshot to produce an updated environment snapshot. The computer system may then provision a computing environment with the first set of computing resources configured using the updated configuration information. For example, the computers system can push the update for the application by deploying updated application instances to the one or more VMs.

In some examples, the computer system can generate the first request and the second request according to a predefined schedule. The predefined schedule may specify that the first request is generated at the same time or at a different time than the second request.

In some examples, the first configuration may include hardware settings or operating system settings of the first set of computing resources. The second configuration may include application data of the second set of computing resources. For example, the first set of computing resources can be bare metal servers running operating systems, while the second set of computing resources can be applications deployed in containers to the bare metal servers. In other examples, the first set of computing resources may include VMs of a computing environment, while the second set of computing resources can include software defined networking components associated with the VMs.

Figure 7:
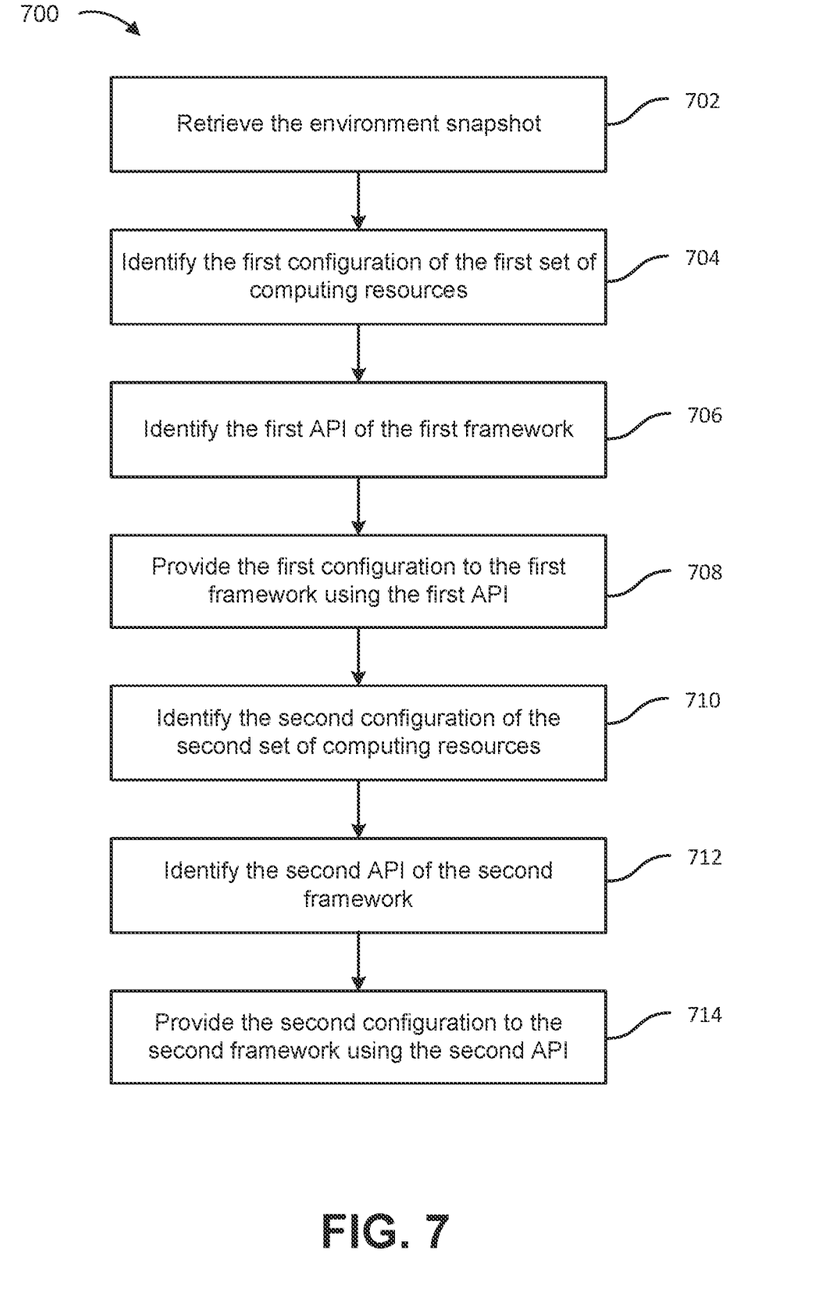
FIG. 7 is a flow diagram of an example process for restoring the configuration of a computing environment using an environment framework controller, according to some aspects of the present disclosure.

FIG. 7 is a flow diagram of an example process 700 for restoring the configuration of a computing environment using an environment framework controller, according to some aspects of the present disclosure. The process 700 can be performed by any of the computer systems described herein configured to implement a provisioning engine, including computer system 500 of FIG. 5. The process 700 may be performed in conjunction with one or more of the operations of process 600 of FIG. 6. For instance, process 700 may be performed after block 608 of FIG. 6.

The process 700 can begin at block 702, with the computer system retrieving a stored snapshot. The snapshot may have been generated and stored by the computer system as part of a prior snapshotting of the computing resources in a distributed computing system. In some examples, the snapshot may be provided from another computer system, such as when transferring a snapshot to a new computer system hosting an environment framework controller in a new data center.

At block 704, the computer system can identify the first configuration for the first set of computing resources. The computer system can identify the first configuration by an explicit reference in the snapshot. The computer system can also identify the first configuration implicitly based on the type of configuration information in the snapshot. At block 706, the computer system can identify the first API of the first framework. The computer system can identify the first API from explicit or implicit information in the snapshot.

At block 708, the computer system can provide the first configuration to the first framework using the first API. The first framework can use the first configuration to provision the first set of computing resources according to the state of the first set of computing resources previously captured and stored in the environment snapshot.

At blocks 710-714, the computer system can perform operations similar to blocks 704-708 but for the second configuration and second set of computing resources. At block 710, the computer system can identify the second configuration of the second set of computing resources using the environment snapshot. At block 712, the computer system can identify the second API of the second framework. At block 714, the computer system can provide the second configuration to the second framework using the second API. The second framework can use the second configuration to provision the second set of computing resources according to the state of the second set of computing resources previously captured and stored in the environment snapshot.

The above description of certain examples, including illustrated examples, has been presented only for the purpose of illustration and description and is not intended to be exhaustive or to limit the disclosure to the precise forms disclosed. Modifications, adaptations, and uses thereof will be apparent to those skilled in the art without departing from the scope of the disclosure. For instance, any examples described herein can be combined with any other examples.

The invention claimed is:

1. A method comprising:
transmitting, by an framework controller executing on a processor, a first request in a first format to a first application programming interface (API) exposed by a first framework which includes a first controller that manages a first set of computing resources in a distributed computing system, wherein the first framework is a container framework or a virtual machine framework, the first request being for a first configuration of the first set of computing resources managed by the first framework, the first configuration describing states of the first set of computing resources;

transmitting, by the framework controller executing on the processor, a second request in a second format to a second API exposed by a second framework which includes a second controller that manages a second set of computing resources in the distributed computing system that is different from the first set of computing resources, the second framework being of a different type than the first framework, and the second format being different from the first format, wherein the second framework is a hardware framework or a networking framework, and wherein the second request is for a second configuration of the second set of computing resources managed by the second framework, the second configuration describing states of the second set of computing resources;

generating, by the framework controller executing on the processor, an environment snapshot indicating the first configuration of the first set of computing resources and the second configuration of the second set of computing resources;

storing, by the framework controller executing on the processor, the environment snapshot; and subsequently using the environment snapshot to redeploy the first set of computing resources in the first configuration and the second set of computing resources in the second configuration.

2. The method of claim 1, wherein transmitting the first request comprises:
identifying, by the processor, the first API of the first framework;
determining that the first request is to have the first format based on the first API of the first framework; and
generating, by the processor, the first request in the first format for compatibility with the first API.

3. The method of claim 1, further comprising:
provisioning a computing environment by:
retrieving, by the processor, the environment snapshot;
determining the first configuration of the first set of computing resources stored in the environment snapshot;
identifying, by the processor, the first API of the first framework;
providing, by the processor, the first configuration to the first framework using the first API, wherein the first framework configures the first set of computing resources according to the first configuration previously captured and stored in the environment snapshot;
determining, by the processor, the second configuration of the second set of computing resources stored in the environment snapshot;
identifying, by the processor, the second API of the second framework; and
providing, by the processor, the second configuration to the second framework using the second API, wherein the second framework configures the second set of computing resources according to the second configuration previously captured and stored in the environment snapshot.

4. The method of claim 1, further comprising:
receiving, by the processor, updated configuration information for the first set of computing resources;
modifying, by the processor, the environment snapshot using the updated configuration information to produce an updated environment snapshot; and
provisioning, by the processor and using the updated environment snapshot, a computing environment comprising the first set of computing resources configured in accordance with the updated configuration information.

5. The method of claim 1, wherein the first request and the second request are transmitted based on a predefined schedule for generating the environment snapshot.

6. The method of claim 1, wherein the first configuration comprises container settings or virtual machine settings, and wherein the second configuration comprises hardware settings or networking settings.

7. The method of claim 1, wherein the first framework is the virtual machine framework and the first set of computing resources include virtual machines of a computing environment, and wherein the second framework is the networking framework and the second set of computing resources include networking components of the computing environment.

8. A computer system comprising:
a processor; and
a memory storing computer-executable instructions that are executable by the processor for causing the computer system to perform operations including:
transmitting a first request in a first format to a first application programming interface (API) exposed by a first framework which includes a first controller that actively manages a first set of computing resources in a distributed computing system, wherein the first framework is a container framework or a virtual machine framework, the first request being for a first configuration of the first set of computing resources managed by the first framework, the first configuration describing states of the first set of computing resources;
transmitting a second request in a second format to a second API exposed by a second framework which includes a second controller that actively manages a second set of computing resources in the distributed computing system that is different from the first set of computing resources, the second framework being of a different type than the first framework, and the second format being different from the first format, wherein the second framework is a hardware framework or a networking framework, and wherein the second request is for a second configuration of the second set of computing resources managed by the second framework, the second configuration describing states of the second set of computing resources;
generating an environment snapshot indicating the first configuration of the first set of computing resources and the second configuration of the second set of computing resources;
storing the environment snapshot; and
subsequently using the environment snapshot to redeploy the first set of computing resources in the first configuration and the second set of computing resources in the second configuration.

9. The computer system of claim 8, wherein the operation of transmitting the first request comprises:
identifying the first API of the first framework;
determining that the first request is to have the first format based on the first API of the first framework; and
generating the first request in the first format for compatibility with the first API.

10. The computer system of claim 8, wherein the operations further comprise provisioning a computing environment by:
retrieving the environment snapshot;
determining the first configuration of the first set of computing resources in the environment snapshot;
identifying the first API of the first framework;
providing the first configuration to the first framework using the first API, the first configuration being used by the first framework to configure the first set of computing resources according to the first configuration previously captured and stored in the environment snapshot;
determining the second configuration of the second set of computing resources in the environment snapshot;
identifying the second API of the second framework; and
providing the second configuration to the second framework using the second API, the second configuration being used by the second framework to implement the second set of computing resources according to the second configuration previously captured and stored in the environment snapshot.

11. The computer system of claim 8, wherein the memory stores additional instructions that are executable by the processor for causing the computer system to further:
receive updated configuration information for the first set of computing resources;
modify the environment snapshot using the updated configuration information to produce an updated environment snapshot; and
provision, using the updated environment snapshot, a computing environment comprising the first set of computing resources configured in accordance with the updated configuration information.

12. The computer system of claim 8, wherein the first request and the second request are transmitted based on a predefined schedule for generating the environment snapshot.

13. The computer system of claim 8, wherein the first configuration comprises container settings, and wherein the second configuration comprises hardware settings.

14. The computer system of claim 8, wherein the first framework is the container framework and the first set of computing resources include containers of a computing environment, and wherein the second framework is the hardware framework and the second set of computing resources include hardware components of the computing environment.

15. A non-transitory computer-readable storage medium storing instructions that are executable by a processor for causing a computer system to perform operations including:
transmitting a first request in a first format to a first application programming interface (API) exposed by a first framework which includes a first controller that actively manages a first set of computing resources in a distributed computing system, wherein the first framework is a container framework or a virtual machine framework, the first request being for a first configuration of the first set of computing resources managed by the first framework, the first configuration describing states of the first set of computing resources;
transmitting a second request in a second format to a second API exposed by a second framework which includes a second controller that actively manages a second set of computing resources in the distributed computing system that is different from the first set of computing resources, the second framework being of a different type than the first framework, and the second format being different from the first format, wherein the second framework is a hardware framework or a networking framework, and wherein the second request is for a second configuration of the second set of computing resources managed by the second framework, the second configuration describing states of the second set of computing resources;
generating an environment snapshot indicating the first configuration of the first set of computing resources and the second configuration of the second set of computing resources, the environment snapshot being usable to redeploy the first set of computing resources in the first configuration and the second set of computing resources in the second configuration at a subsequent point in time; and
storing the environment snapshot.

16. The non-transitory computer-readable storage medium of claim 15, wherein the operation of transmitting the first request comprises:
identifying, by the processor, the first API of the first framework; and
generating, by the processor, the first request according to the first API.

17. The non-transitory computer-readable storage medium of claim 15, storing additional instructions that are executable by the processor for causing the computer system to further provision a computing environment by:
retrieving the environment snapshot;
identifying, using the environment snapshot, the first configuration of the first set of computing resources;
identifying the first API of the first framework;
providing the first configuration to the first framework using the first API, the first configuration being usable by the first framework to configure the first set of computing resources according to the states of the first set of computing resources previously captured and stored in the environment snapshot;
identifying, using the stored environment snapshot, the second configuration of the second set of computing resources;
identifying the second API of the second framework; and
providing the second configuration to the second framework using the second API, the second configuration being usable by the second framework to implement the second set of computing resources according to the states of the second set of computing resources previously captured and stored in the environment snapshot.

18. The non-transitory computer-readable storage medium of claim 15, storing additional instructions that are executable by the processor for causing the computer system to further:
receive updated configuration information for the first set of computing resources;
modify the environment snapshot using the updated configuration information to produce an updated environment snapshot; and
provision, using the updated environment snapshot, a computing environment comprising the first set of computing resources configured in accordance with the updated configuration information.

19. The method of claim 1, wherein the first framework is the container framework, and further comprising:
transmitting, by the framework controller executing on the processor, a third request in a third format to a third API exposed by a third framework which includes a third controller that actively manages a third set of computing resources in the distributed computing system, wherein the third set of computing resources is different from the first set of computing resources and the second set of computing resources, the third framework is the virtual machine framework, the third format is different from the second format and the first format, and the third request is for a third configuration of the third set of computing resources managed by the third framework, the third configuration describing states of the third set of computing resources; and
generating, by the framework controller executing on the processor, the environment snapshot to additionally indicate the third configuration of the third set of computing resources.

20. The method of claim 19, wherein the second framework is the hardware framework, and further comprising:
transmitting, by the framework controller executing on the processor, a fourth request in a fourth format to a fourth API exposed by a fourth framework including a fourth controller that actively manages a fourth set of computing resources in the distributed computing system, wherein the fourth set of computing resources is different from the first, second, and third sets of computing resources, the fourth framework is the networking framework, the fourth format is different from the first, second, and third formats, and the fourth request is for a fourth configuration of the fourth set of computing resources managed by the fourth framework, the fourth configuration describing states of the fourth set of computing resources; and
generating, by the framework controller executing on the processor, the environment snapshot to additionally indicate the fourth configuration of the fourth set of computing resources.

* * * * *